United States Patent [19]

Sullivan et al.

[11] 4,418,938

[45] Dec. 6, 1983

[54] VEHICLE STRUT SUSPENSION WITH CAMBER ADJUSTMENT

[75] Inventors: Floyd A. Sullivan, Grand Ledge; Arthur H. Elbers, Holt; Charles M. Trierweiler, Lansing, all of Mich.

[73] Assignee: General Motors Corporation, Detroit, Mich.

[21] Appl. No.: 304,320

[22] Filed: Sep. 21, 1981

[51] Int. Cl.³ .............................................. B62D 17/00
[52] U.S. Cl. ..................................... 280/661; 280/668
[58] Field of Search ........................ 280/661, 663, 668

[56] References Cited

U.S. PATENT DOCUMENTS

| | | | |
|---|---|---|---|
| 3,917,308 | 11/1975 | Schulz | 280/661 |
| 4,194,760 | 3/1980 | Shiomi et al. | 280/661 |
| 4,313,617 | 2/1982 | Muramatsu et al. | 280/661 |

Primary Examiner—Richard A. Bertsch
Attorney, Agent, or Firm—Dean L. Ellis

[57] ABSTRACT

The hydraulic strut assembly and the wheel support knuckle of a vehicle strut type suspension are mounted in the vehicle such that the vehicle sprung mass imposes a force couple tending to drive the suspension parts toward a maximum negative camber position, and an adjustable set screw device is threadably mounted in the knuckle to abut the strut lower end and oppose the force couple to hold a selected camber position.

3 Claims, 5 Drawing Figures

VEHICLE STRUT SUSPENSION WITH CAMBER ADJUSTMENT

This invention relates to vehicle wheel suspensions and more particularly to strut type vehicle wheel suspensions and to wheel camber and like wheel alignment provisions therein.

It is known to provide strut type vehicle suspensions with adjustable interconnection between the lower end of the strut member and the wheel support knuckle permitting selection of wheel camber alignment. Schulz U.S. Pat. No. 3,917,308 discloses such an arrangement including through-bolt fasteners holding a clamping bracket on the strut lower end to a portion of the wheel support knuckle and further including a rotary cam element on one bolt on an axis of one of such members and trapped between guide cheeks on the other and rotatably adjustable to force such members angularly to varying camber relationships. Such cam construction tends to involve unduly precise operational routine by service technicians during camber setting with the use of wrenches at both ends of the combined through-bolt and cam element fastener device to achieve simultaneous loosening or tightening of such fastener, while also maintaining a precise angular position of the cam element. Further, practical embodiments of such a cam bolt fastener involve appreciable added expense both in the construction of the fastener itself and in provision on the supporting bracket of straddling cheeks or embossments with which the cam cooperates.

With the present invention, advantage is achieved in utilizing a peculiar static force relationship which arises in a variety of strut type suspensions, i.e., one in which a force couple tends to drive the wheel support knuckle and wheel assembly toward a maximum negative camber condition. A set screw arrangement is provided to partake of this force condition in such a way that the set screw acts as a physical stop counteracting such force couple to hold some selected wheel camber setting within a range thereof. Camber selection proceeds by threaded adjustment of the set screw completely independently of attention to tightening or loosening torque on the through-bolt fasteners. The bolt fasteners are first loosened and the camber setting is performed with the vehicle mass resting upon the wheels. The selected camber adjustment, once performed, is then very simply held by independent tightening operation on the through-bolt fasteners, and again, without attention to the set screw. The set screw adds little direct cost and does not require further special configurations of cooperating guide embossments or the like on the strut suspension elements.

These and other objects, features and advantages of the invention will be readily apparent from the following specification and drawings wherein.

Figure 1:
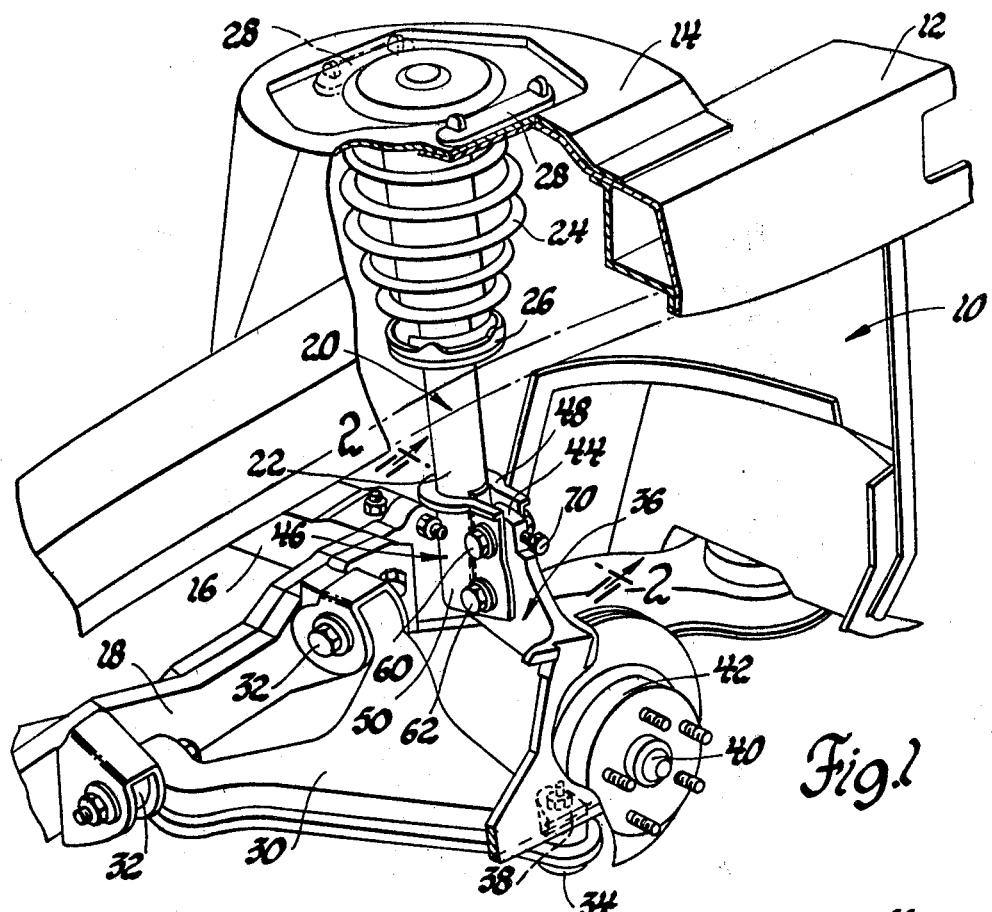
FIG. 1 is a fragmentary perspective view of a vehicle strut type suspension with parts partially broken away.

Referring now particularly to FIG. 1 of the drawings, the invention is illustrated in connection with an automotive vehicle chassis of frame/body integral construction which will be generally referred to as a vehicle sprung mass and indicated by the reference character 10. It includes a combination of stamped and welded sheet metal superstructure defining an upper box section frame rail 12 extending longitudinally of the sprung mass and having welded thereto a strut mounting panel or tower 14. Therebelow there is provided a drive aggregate cradle 16 constituting a separate assembly but which is suitably attached to the superstructure by isolation mounts, not shown, as is known in the art. Such cradle 16 includes a longitudinal rail assembly 18 affording attachment points for the lower control arm element of a strut type suspension.

The strut suspension is designated generally as 20 and here illustrated at the left front wheel area. The principles of this invention, as will be described, are, of course, equally applicable whether the suspension be employed front or rear, driving or non-driving, and steerable or non-steerable. It will be understood that for purposes of the invention, therefore, no description will be made of the steering or drive axle elements which may be incorporated with such suspensions.

Suspension 20 generally includes a hydraulic shock absorber strut member 22 formed of telescopic upper and lower piston and cylinder members which, as is well known, are adapted to foreshorten or extend under wheel motion for dampening thereof. It also includes thereon a helical suspension spring 24 between a seat element 26 on the lower telescopic element and a seat, not shown, at the top of the strut member 22 associated with the upper piston element. Such upper seat may include appropriate rubber isolation and rotary bearing elements, all as is well known, and screw fasteners 28 which fixedly attach such upper end of the strut member 22 to the tower 14 of the sprung mass in non-adjustable relationship therewith, in the present embodiment.

The lower control arm 30 of the suspension extends laterally from rubber bushed pivot connections 32 including brackets on the rail assembly 18, and carries a ball joint means 34 at its distal end adapted for connection to a wheel support member or knuckle. Such knuckle is designated generally as 36 and includes a lower mounting boss 38 attached by the ball joint 34 to the lower control arm. The knuckle 36 is of conventional configuration including suitable mounting means for a caliper type disc brake backing plate and caliper assembly, all as known in the art, as well as the usual mounting spindle, indicated at 40, which carries a vehicle wheel assembly 42 rotatably thereon. A portion 44 of knuckle 36 extends upwardly for connection to the strut member 22 in a manner now to be described.

Figure 2:
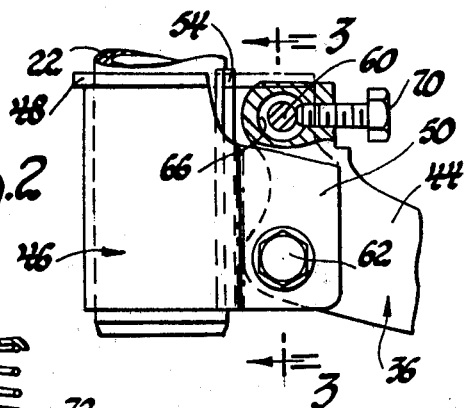
FIG. 2 is an enlarged partially broken away fragmentary elevational view taken generally along the plane indicated by lines 2—2 in FIG. 1.
Figure 3:
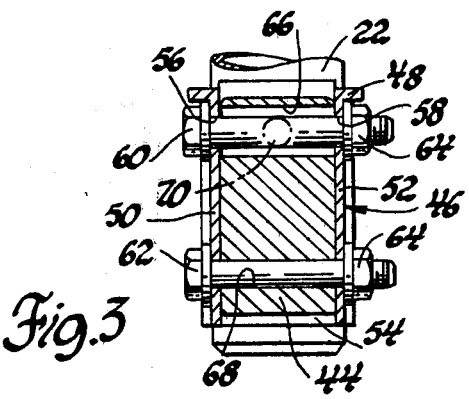
FIG. 3 is a sectional view, partially in phantom, taken generally along the plane indicated by lines 3—3 in FIG. 2.

Referring to FIG. 2, the lower end of the strut member lower element carrying the spring seat 26 is provided with a clamp type saddle bracket 46 of relatively heavy sheet metal stock provided with a reinforcement flange 48. It is of generally U-shape and may be spot welded or attached in similar manner to the lower element of the strut. Between the bracket legs 50 and 52 of such bracket 46, there is situated a reinforcing plate 54 attached to the cylindrical surface of the strut lower element, seen also in FIG. 3. Referring to the latter figure, upper and lower sets of aligned bolt holes 56 and 58, respectively, are provided in legs 50 and 52 to receive therethrough in close fitting relationship respective through-bolt fasteners 60 and 62, with nuts 64 threaded thereupon. The upper portion 44 of knuckle 36 is received between legs 50 and 52 and likewise includes upper and lower bolt receiving apertures 66 and 68. Lower aperture 68 is of a size to closely receive the bolt 62 while aperture 66 is substantially enlarged, for purposes to appear. A set screw 70 is threadably mounted in upper knuckle portion 44 to extend transversely or inboard of the sprung mass 10 on an axis which intersects the longitudinally oriented axis of bolt holes 56 and bolt 60. The inner or inboard end of set screw 70 projects within aperture 68 so as to be abutted upon bolt 60. It is free of constraint of any nature other than its threaded mounting within knuckle portion 44.

Figure 5:
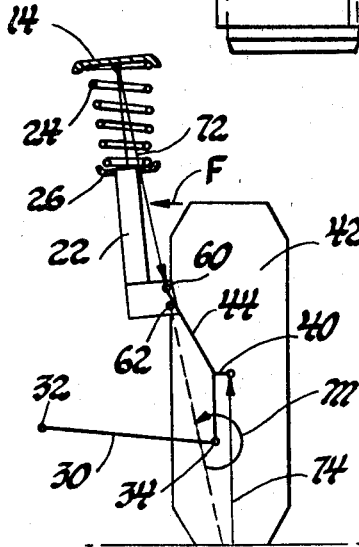
FIG. 5 is a diagrammatic front elevational view of a suspension showing force vector relationships.

Referring to FIG. 5, a force diagram is illustrated which is generally indicative of the characteristics of a variety of strut type suspension arrangements present in motor vehicles manufactured by the assignee of this invention. The compressed force of spring 24, including preload, which bears the weight of sprung mass 10 is represented by vector 72, which is seen to align through the upper end of strut 22 and generally through the bolts 60 and 62. The reaction of the ground where wheel assembly 42 rests is represented by another vector 74, aligned vertically from the ground generally through the spindle 40 in the middle vertical plane of the wheel assembly. The result is a force couple or moment M which, as viewed from the vehicle front elevation, is a counterclockwise force about ball joint 34 of lower control arm 30. Such moment M, of course, may be resolved as a lateral force F at the top of the vehicle wheel assembly 42 tending to move such wheel assembly thereat inboard of the vehicle sprung mass to a negative camber condition.

Referring to FIG. 2, force couple or moment M acts about the axis of bolt 62, resting in its cloe-fitting holes 58, to tend to rotate the vehicle wheel assembly 42 and knuckle 36 about such axis and carry set screw 70 inboard. The end of the set screw physically abuts bolt 60 to provide a stop. The close constraint of bolt 60 in its holes 56 within bracket 46 thus, in turn, reacts such moment M directly within the lower strut end.

A range of camber adjustment is available to the wheel assembly 42 and knuckle 36 in accordance with the difference between the predetermined over-large diameter of aperture 66 and that of bolt 60. Thus, in FIG. 2, a more negative camber for wheel assembly 42 may be achieved by allowing the right hand wall of aperture 66 to approach engagement with bolt 60, and conversely, more positive wheel camber may be achieved by moving the left hand wall of such aperture toward the bolt. Such adjustment proceeds first by loosening of nuts 64 on both bolts 60 and 62 to relieve clamping force of bracket 46. Then, a simple rotation of set screw 70 on its threads within knuckle portion 44 can vary the exposed length of the set screw within aperture 66. Outboard translation of the set screw permits the moment M to move the parts about the axis of bolt 62 to a more negative camber, while a positive torqued threading inboard of the set screw against moment M, while abutted against bolt 60, causes the knuckle and wheel assembly to rotate clockwise to a more positive camber condition about the axis of bolt 62. Such adjustment, of course, may proceed with the vehicle mass 10 resting upon the ground at wheel assembly 42. Once the desired camber adjustment is made, the nuts 64 and bolts 60 and 62 are tightened to prescribed torque for sufficient clamping load at legs 50 and 52 and there need be no attention to the rotary position of the heads of the bolts during such tightening process or any further attention to set screw 70. Likewise, once the camber adjustment is made, the vehicle may if necessary be lifted from the ground on a hoist or the like, and tightening tools reapplied to the bolts 60 and 62 without any conscious attention to anything but the final tightening operation.

It is, of course, to be understood that there are modifications of the arrangement thus far described which can be utilized within the spirit of the invention. For example, rather than employing a closely constrained bolt 62 at the lower set of bolt holes 58 to serve as the camber adjustment axis, the same may be achieved at the upper holes 56. The set screw might be mounted upon a flange of the bracket 46 and threadable relative thereto inboard or outboard to abut knuckle portion 44, and rather than providing the overlarge aperture 66 in the knuckle it may be provided at the bracket holes 58. In any case, advantage is achieved by having the set screw independently adjustable to various transverse inboard and outboard locations without simultaneous attention to the rotary position of bolts 60 and 62.

Figure 4:
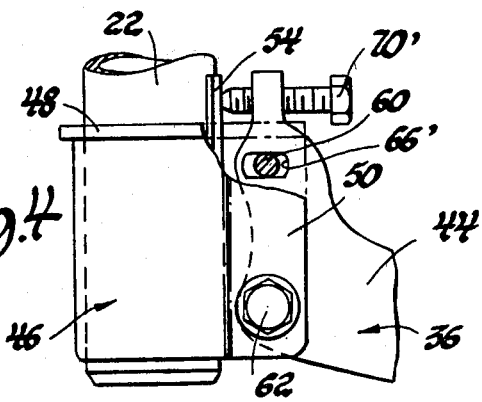
FIG. 4 is a fragmentary elevational view similar to FIG. 2 showing another embodiment of the invention.

One particular alternative embodiment is depicted in FIG. 4, where the parts are identical to that described heretofore with the exception that the overlarge aperture 66' is in the form of a milled slot of double D-shaped configuration which closely confines bolt 60 in the vertical direction for added vertical structural rigidity of the bracket and knuckle interassociation. Additionally, the modification illustrates alternative positions at which the set screw 70' may abut a fixed portion of the lower end of the strut 22. Here, the set screw inner end abuts the plate 54 under the counter-clockwise moment M, and at a location which provides some added lever arm relative the axis of bolt 62 for perhaps some added ease in achieving a torqued set screw adjustment during the camber setting procedure. Various such refinements within the spirit of the invention will be readily apparent to those skilled in the art.

The embodiments of the invention in which an exclusive property or privilege is claimed are defined as follows:

1. In a vehicle wheel suspension including a wheel support means, a wheel thereon, a strut arranged on a generally upright axis and connected at its upper end to the vehicle sprung mass and at its lower end adapted for connection to the wheel support means, and a lateral arm member swingably mounted at an inner end on the sprung mass and connected at its outboard end by joint means to a lower end of the wheel support means, the improvement which comprises, said axis of said strut being so disposed relative to the median vertical plane of said wheel as to create a force couple urging the top of said wheel inboard of the vehicle sprung mass, a pair of bracket walls on said strut lower end and including upper and lower sets of horizontally aligned bolt holes, a portion of said wheel support means received between said bracket walls and including upper and lower bolt-receiving apertures each registered in combination with a corresponding said set of bolt holes, bolt fasteners extending through each said bolt hole sets and registered apertures, one of said aperture or bolt hole set of one of said bolt hole set and registered aperture combinations being of enlarged size in direction inboard and outboard the vehicle sprung mass relative the size of said bolt fastener to permit a limited range of relative movement between said strut lower end and said wheel support portion for wheel camber adjustment, and a set screw otherwise unconstrained but threadedly mounted in one of said wheel support portion or strut lower end adjacent said enlarged aperture or bolt hole set and extending transversely of the vehicle sprung mass, said set screw having its inboard end exposed to be abutted under the urging of said force couple against the other of said strut lower end and wheel support portion whereby to provide thereat a physical stop resisting said force couple, said set screw being threadable transversely to locate said wheel support means at a selected camber setting within the range of movement permitted by said enlarged aperture or bolt hole set.

2. In a vehicle wheel suspension including a wheel support means, a wheel thereon, a strut arranged on a generally upright axis and connected at its upper end to the vehicle sprung mass and at its lower end adapted for connection to the wheel support means, and a lateral arm member swingably mounted at an inner end on the sprung mass and connected at its outboard end by joint means to a lower end of the wheel support means, the improvement which comprises, said axis of said strut being so disposed relative to the median vertical plane of said wheel as to create a force couple urging the top of said wheel inboard of the vehicle sprung mass, a pair of bracket walls on said strut lower end and including upper and lower sets of horizontally aligned bolt holes, a portion of said wheel support means received between said bracket walls and including upper and lower bolt-receiving apertures each registered in combination with a corresponding said set of bolt holes, bolt fasteners extending through each said bolt hole sets and registered apertures, one of said apertures being of enlarged size in direction inboard and outboard the vehicle sprung mass relative the size of said bolt fastener passage therethrough to permit a limited range of relative movement between said strut lower end and said wheel support portion for wheel camber adjustment, and a set screw otherwise unconstrained but threadedly received in said wheel support portion adjacent said enlarged aperture and extending transversely of the vehicle sprung mass, said set screw having its inboard end exposed to be abutted under the urging of said force couple against the strut lower end whereby to provide thereat a physical stop resisting said force couple, said set screw being threadable transversely to locate said wheel support means at a selected camber setting within the range of movement permitted by said enlarged aperture or bolt hole set.

3. In a vehicle wheel suspension including a wheel support means, a wheel thereon, a strut arranged on a generally upright axis and connected at its upper end to the vehicle sprung mass and at its lower end adapted for connection to the wheel support means, and a lateral arm member swingably mounted at an inner end on the sprung mass and connected at its outboard end by joint means to a lower end of the wheel support means, the improvement which comprises, said axis of said strut being so disposed relative to the median vertical plane of said wheel as to create a force couple urging the top of said wheel inboard of the vehicle sprung mass, a pair of bracket walls on said strut lower end and including upper and lower sets of horizontally aligned bolt holes, a portion of said wheel support means received between said bracket walls and including upper and lower bolt-receiving apertures each registered with a corresponding said set of bolt holes, bolt fasteners extending through each said bolt hole sets and registered apertures, one of said apertures being of enlarged size in direction inboard and outboard the vehicle sprung mass relative the size of the respective said bolt fastener passing therethrough to permit a limited range of relative movement between said strut lower end and said wheel support portion for wheel camber adjustment, and a set screw otherwise unconstrained but threadedly received in said wheel support portion end adjacent said enlarged aperture or bolt hole set and extending transversely of the vehicle sprung mass on an axis intersecting the axis of said respective bolt fastener, said set screw having its inboard end exposed to be abutted under the urging of said force couple against said respective bolt fastener whereby to provide thereat a physical stop resisting said force couple, said set screw being threadable transversely to locate said wheel support means at a selected camber setting within the range of movement permitted by said enlarged aperture or bolt hole set.

* * * * *